E. F. KRELL.
SPRING WHEEL.
APPLICATION FILED JAN. 24, 1913.
1,100,137.
Patented June 16, 1914.
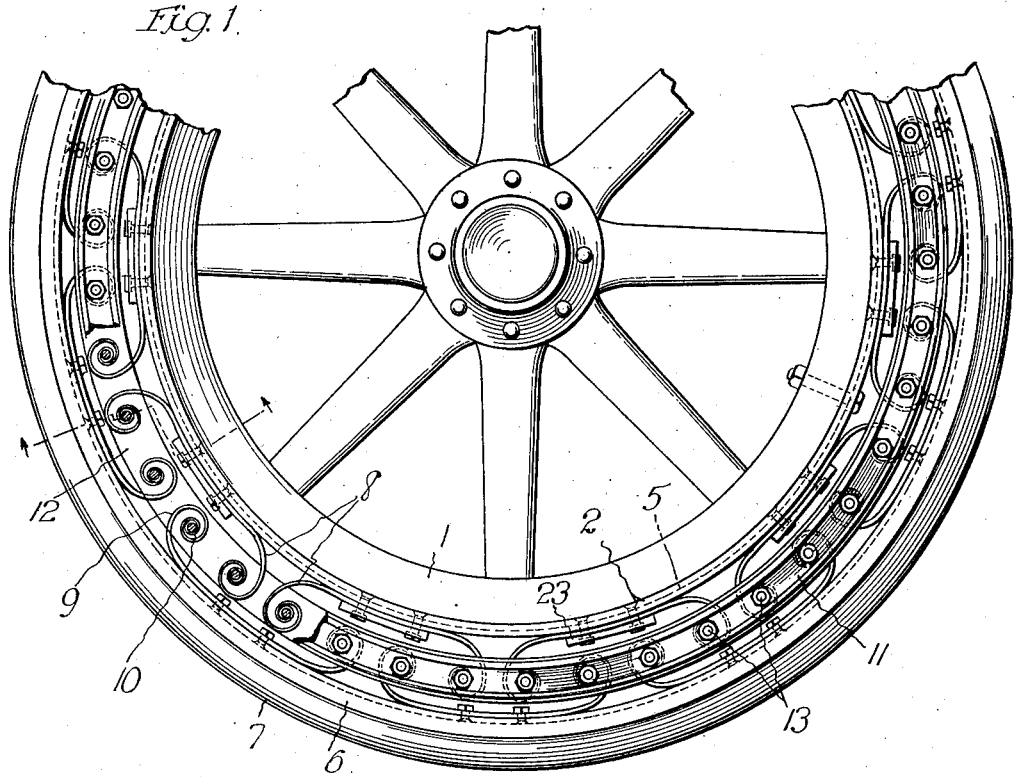
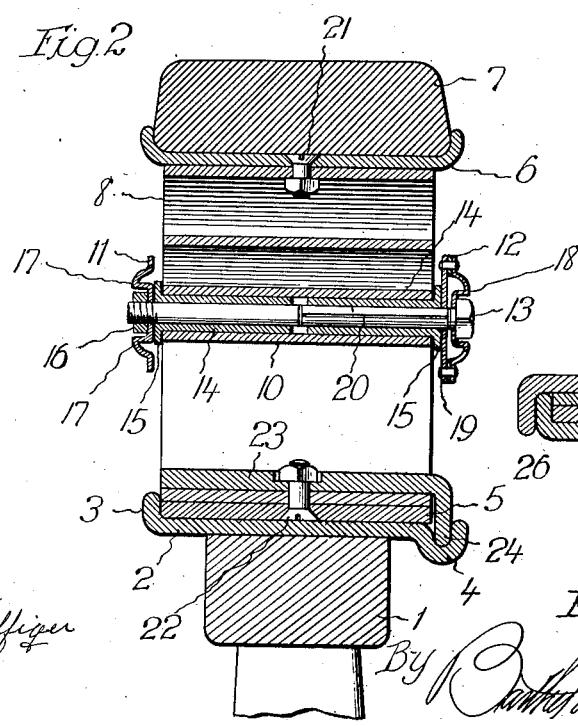

UNITED STATES PATENT OFFICE.

EMIL F. KRELL, OF DETROIT, MICHIGAN.

SPRING-WHEEL.

1,100,137.

Specification of Letters Patent.

Patented June 16, 1914.

Application filed January 24, 1913. Serial No. 743,904.

*To all whom it may concern:*

Be it known that I, EMIL F. KRELL, a citizen of the United States of America, residing at Detroit, in the county of Wayne and State of Michigan, have invented certain new and useful Improvements in Spring-Wheels, of which the following is a specification, reference being had therein to the accompanying drawings.

This invention relates to an improved spring tire for vehicle wheels and its object is to provide a construction in which the springs are so formed and arranged as to permit a free movement of an outer rim on the tire in any direction and further to provide a construction which is such that ample resiliency is secured without materially increasing the over-all diameter of the tire above that of the pneumatic tire in common use.

A further object is to so construct the tire that it may be readily secured in place upon the rim of the ordinary automobile wheel and detached therefrom for the purpose of replacement or repair.

It is also an object of the invention to provide a very compact construction having a pleasing appearance and embodying certain other new and useful features hereinafter more fully described and more particularly pointed out in the claims reference being had to the accompanying drawing in which, Figure 1 is a partial side elevation of a vehicle wheel with a tire in place thereon embodying the invention, portions of the tire being broken away to show the construction; Fig. 2 is an enlarged transverse section of the tire and wheel rim taken upon the line 2—2 of Fig. 1; and Fig. 3 is a sectional detail of a portion of the tire and wheel rim showing a modified construction.

The tire embodying the invention may be applied to any of the common forms of wheels for use upon motor and other vehicles and for convenience of illustration the same is shown as applied to a wheel having a wood felly 1 upon which a metal rim 2 is permanently secured in the usual manner. As shown in Figs. 1 and 2 this rim is formed with an outwardly extending flange 3 at one side and with a groove 4 along its opposite edge. Rims of substantially this form are in common use and are adapted for the application thereto of what is known as a quick detachable tire or a very similar rim is used in conjunction with a detachable rim which may be slipped thereover and secured in place thereon.

This invention consists in a spring tire having an inner ring 5 of a diameter to just slip laterally over the rim 2 and fit closely thereon. An outer ring or rim member 6 which is considerably larger in diameter than the ring 5, is formed in any suitable manner to hold a tread ring or member 7 which may be formed of any suitable material such as rubber and is preferably made solid in cross section.

To hold the rings 5 and 6 spaced apart and to provide the necessary resiliency, springs 8 are secured alternately to the inner and outer rings with the springs arranged in overlapping relation. Each spring is turned at each end into a spiral having a single convolution 9 which terminates in a closed eye 10 and each spring is preferably formed tapering in thickness with the thickest portion of the spring intermediate its ends. The springs which are secured to the outer rim 6 are spaced just far enough apart so that upon flexure the end convolutions of adjacent springs will not come into contact and the springs which are secured to the inner rim 5 are spaced in a like manner with their adjacent ends arranged intermediate the ends of the outer springs. The eyes 10 of both inner and outer springs are thus positioned mid-way between the rims 5 and 6 and the ends of all of the springs are connected by means of connecting or bearing rings 11 and 12, each formed with a series of holes forming bearings to receive bolts 13 which pass through the eyes 10 in the ends of the several springs.

A pair of sleeves 14 is provided for each bolt 13 and each sleeve is formed with a flange 15 on its outer end to engage the end of the eye of the spring, said sleeves thus forming a bearing bushing for each bolt. The bearing ring 11 is preferably formed of sheet metal with an annular groove in its outer face to receive the heads or nuts 16 on the several bolts and in forming this groove the metal is struck up at each side thereof to form hollow strengthening ribs 17. The ring 12 is formed in a like manner with a sheet metal ring 18 having an annular groove and hollow strengthening ribs 17 but a flat ring plate 19 is riveted or otherwise secured to the inner face of the ring 18 with a packing interposed between the edges of said rings to form a hollow lubricant retaining ring or chamber from which lubricant is drawn to lubricate the bearing surface of each eye 10, through a channel 20 formed in each bolt 13. This channel opens laterally through the sides of the bolt intermediate its ends to discharge the lubricant into the space between the adjacent ends of the sleeves 14 where it reaches the inner bearing surface of the eye of the spring and works out each way along the sleeves and thoroughly lubricates the bearing.

The outer springs are firmly secured to the outer rim 6 by means of bolts 21 and the inner springs are secured in a like manner to the inner rim 5 by means of bolts 22 which also pass through suitable clips 23, seated upon the inner surface of the spring and each formed with a flange 24 at one end extending laterally inward at one side of the spring and rim into engagement with the groove 4 in the wheel rim 2. The rim 5 is thus firmly secured in place upon a wheel rim by the clips 23 and the whole tire structure comprising the rims 5 and 6 with interposed springs and outer tread 7 may be readily removed from the wheel rim by detaching the clips 23 and then slipping the rim 5 laterally from engagement with the wheel rim. When the tire structure is in place the ring 5 is prevented from lateral movement upon the wheel rim in one direction by the flange 3 and in the opposite direction by the engagement of the clips 23 with the groove 4 in the edge of the wheel rim.

In the modified construction shown in Fig. 3, a wheel rim 25 of a form commonly used to hold what is known as a clencher tire is shown. This rim is usually provided with a flange 26 along each edge to engage the tire and hold it in place and to provide for securing the tire embodying the invention in place upon a wheel rim of this construction, one of these flanges is cut-away to permit the ring 5 to slip laterally thereover. When in place the ring 5 engages the remaining flange 26 and the tire is held in place as before by means of the clips 23 which, however, are turned end for end to bring their flanges 24 over the flange 26 on the wheel rim and thus lock the tire in place. The spiral form of the springs permit a free movement of the outer rim in any direction radially or circumferentially of the wheel and by connecting the volute spring ends of the springs which are secured to the inner rim with those of the springs which are attached to the outer rim, a very resilient tire is secured which will yield readily under load but will rigidly hold the outer rim against movement laterally of the wheel. The particular arrangement of the spiral springs with their ends in overlapping relation gives the desired play or movement between the inner and outer rims of the tire without the necessity for making the tire of large diameter. A spring tire of this construction may, therefore, be made to fit wheels having the usual diameters and such tires will have an external diameter which is substantially the same as that of a pneumatic tire of the proper size for the same wheels.

Obviously, changes may be made in the construction and arrangement of parts without departing from the spirit of my invention and I do not therefore limit myself to the particular form or construction shown.

Having thus fully described my invention what I claim is:—

1. In a tire the combination of an inner ring member, an outer ring member, two series of springs between said members, one series being secured to the inner member and the other to the outer member with adjacent yielding ends, and means including bearing rings and transverse connections between said rings for connecting the adjacent yielding ends of the springs, said means being independent of said inner and outer members and forming the sole connection between the springs on the inner member and the springs on the outer member.

2. In a tire the combination of an inner annular member, an outer annular member, a series of springs secured to the inner member, a series of springs secured to the outer member with their ends overlapping the springs on the inner member and all of said springs being formed with spiral ends, and means including bearing rings and transverse connections between said rings for connecting the spiral end of each spring on the inner member with an adjacent spiral end of a spring on the outer member, said means being free of said members.

3. A spring tire comprising an inner annular member, an outer annular member, a series of springs on each annular member each formed with a spiral end terminating in an eye and said springs being arranged with the spiral ends of the springs on the outer annular member adjacent to the spiral ends on the springs on the inner annular member, means extending through the eyes of the springs and connecting the springs on the inner annular member with the springs on the outer annular member, said means being supported solely by said springs.

4. A tire comprising an inner annular member, an outer annular member, a series of springs secured to the inner member and having outwardly extending spiral ends, a series of springs secured to the outer annular member and having inwardly extending spiral ends, and annular members independent of said inner and outer members and attached to the spiral ends of the springs at the sides thereof and forming a connection between the springs on the inner annular member with the springs on the outer annular member.

5. A spring tire comprising an inner ring member, an outer ring member, a series of springs secured to the inner member and formed with outwardly extending spiral ends each terminating in an eye, a series of springs secured to the outer ring member and each formed with an inwardly extending spiral end terminating in an eye, the spiral ends of the springs on the outer member being extended inward between adjacent spiral ends of the springs on the inner member, annular members at the sides of the springs, and means including bolts and bushings engaging the annular members and the eyes in the springs to connect the springs on the inner ring member with the springs on the outer ring member.

6. A spring tire comprising an inner ring member, an outer ring member, a series of springs secured to the inner member, a series of springs secured to the outer member, all of said springs being formed with spiral ends terminating in bearing eyes and arranged with the springs on the outer member overlapping the springs on the inner member, an annular member at each side of the springs, bushings extending into said bearing eyes, and bolts passing through the annular members and said bushings.

7. A spring tire comprising an inner ring member, an outer ring member, alternately arranged sets of springs carried by said members with the ends of one set of springs extending between the ends of the other set of springs with the ends of all of said springs equally spaced and provided with eyes, annular members at the sides of said springs, bushings extending into the eyes of said springs, and means extending through said bushings and connecting said annular members.

8. A spring tire comprising an inner ring member, an outer ring member, a series of springs secured to the inner ring member with outwardly extending spiral ends terminating in eyes, a series of springs secured to the outer ring member with inwardly extending spiral ends terminating in eyes, the springs on the outer ring member overlapping the ends of the springs on the inner ring member, annular bearing members at the sides of the springs each formed with hollow annular ribs, and bolts passing through the annular members and through the eyes in the springs.

9. A spring tire, comprising an inner ring member, an outer ring member, a series of springs secured to the inner ring member, a series of springs secured to the outer ring member in staggered relation to the springs on the inner member, the ends of the springs of one member extending between the ends of the springs of adjoining members, means at the sides of said springs for connecting and equally spacing the ends of said springs, a wheel rim of a diameter to fit within the inner ring member, and a series of clips on the inner ring member to engage the wheel rim and detachably securing the ring member in place thereon.

10. In a spring tire the combination with a wheel rim, of an inner ring member fitting over the wheel rim, an outer ring member forming a seat for a tread member, a series of springs secured to the inner ring member and each formed with a spiral end terminating in an eye, a series of springs secured to the outer ring member and each formed with an inwardly extending spiral end terminating in an eye, the springs on the outer member having adjacent spiral ends extending inward between adjacent spiral ends on the springs secured to the inner ring member, an annular member at each side of the springs, bolts having bearings in the annular members, sleeves on the bolts engaging the eyes of the springs, and a series of clips detachably secured to the inner ring member in engagement with the wheel rim to detachably hold the inner ring member in place upon the wheel rim.

In testimony whereof I affix my signature in presence of two witnesses.

EMIL F. KRELL.

Witnesses:
ANNA M. DORR,
LEWIS E. FLANDERS.

Copies of this patent may be obtained for five cents each, by addressing the "Commissioner of Patents Washington, D. C."